Feb. 14, 1928.
A. KREBS
1,658,927
METAL WORKING MACHINE
Filed April 11, 1924    2 Sheets-Sheet 1
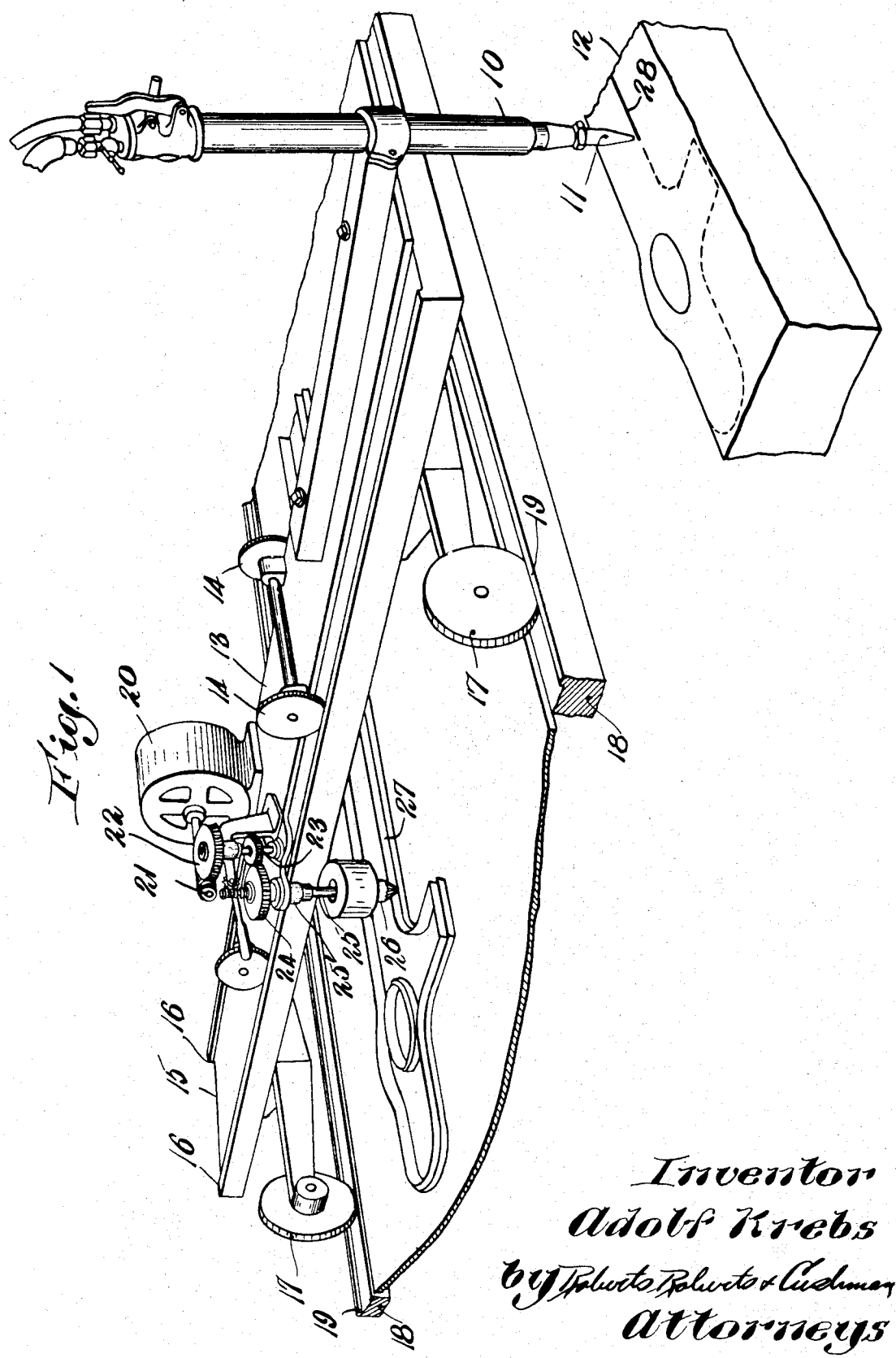
Inventor
Adolf Krebs
by Roberts Roberts & Cushman
Attorneys

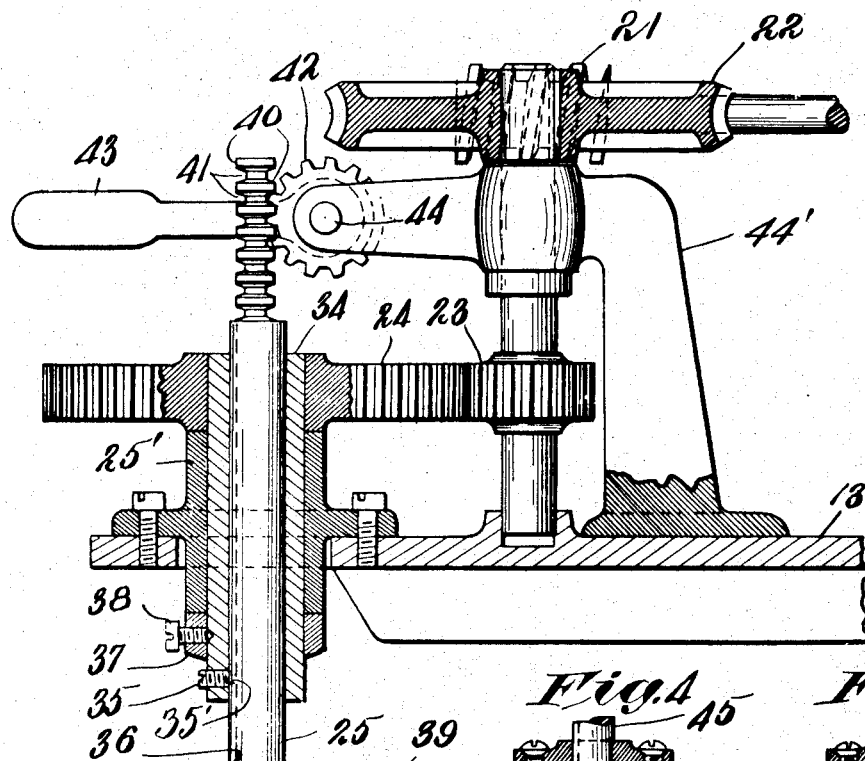
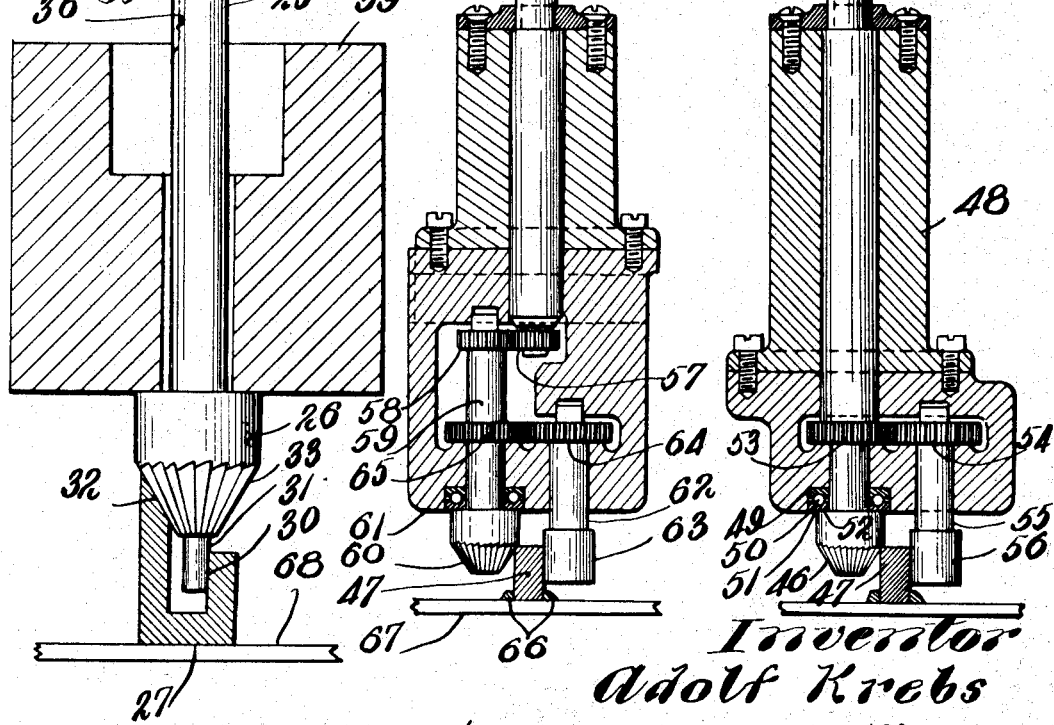

Patented Feb. 14, 1928.

1,658,927

UNITED STATES PATENT OFFICE.

ADOLF KREBS, OF BOSTON, MASSACHUSETTS, ASSIGNOR TO THE OXWELD RAILROAD SERVICE COMPANY, OF NEW YORK, N. Y., A CORPORATION OF DELAWARE.

METAL-WORKING MACHINE.

Application filed April 11, 1924. Serial No. 705,839.

This invention relates to machines for automatically moving and guiding a blow torch or other operative instrumentality along a predetermined path in accordance with a pattern or template.

In the prior art, machines have been devised in which a blow torch is automatically moved by a rotating template follower engaging the edge of a fixed template. When the relation of the template and follower is such that it is necessary to raise the follower to remove it from any particular part of the edge of the template, or to place it in position to follow the template it has been necessary in prior machines to lift the objectionably large and cumbersome mechanism supporting the follower or to make some other inconvenient manipulation.

In a prior type of template following machine, a rotating shaft automatically drives the follower along one edge of a template while a tracer portion slides along another similarly directed edge of the template. The relation to the template of the driver and tracer portions of the follower is such that continual sliding takes place between the tracer and the engaged portion of the template, thus producing an undesirable amount of friction, which not only increases the load on the motor driving the template follower and increases the strain and wear on the template, but tends to cause unevenness of operation and fluctuations in the movement of the follower along the edge of the template.

Objects of the present invention are to overcome the above difficulties, to provide efficient means for lifting the follower from the template and axially shifting the follower with minimum effort and without interfering with rotation of the follower; to provide a template follower having separate rotating driver and tracer portions arranged to roll upon the template with reduced friction, and generally to improve machines of the kind referred to.

In one aspect of the invention, a rotating template follower is so arranged that it can be conveniently displaced axially without disturbing the driving mechanism for rotating the follower. The follower shaft is provided with a rack with which a pinion meshes to cause axial movement of the follower. The pinion is conveniently rotated by manually tilting a lever coupled to it.

In another aspect, apparatus of the kind referred to is provided with a template follower having a power rotated driver shaft for propelling the follower along an edge of the template and having a power rotated tracer shaft for rolling along another similarly directed edge of the template to be traced, thus affording anti-friction mechanism for following contour of the template. Other features of the invention will be apparent from the detailed description which follows.

For the purpose of illustrating the principles of the invention, specific modifications of concrete embodiments are shown in the accompanying drawing, in which:—

Fig. 1 is a perspective view showing a template guided torch cutting machine;

Fig. 2 is an elevation partly in section of the template following mechanism; and Figs. 3 and 4 are modifications of a portion of Fig. 2.

In Fig. 1, a blow torch 10 or other thermal instrumentality of well known construction, having a nozzle 11 for directing a flame vertically downward toward the work material 12, is supported from one end of the carriage 13 having wheels 14 rolling on the horizontal floor of carriage 15 provided with the upturned edges 16 for guiding the wheels and restricting carriage 13 to linear movement with respect to carriage 15. Carriage 15 is supported on wheels 17 which in turn are supported on the upper horizontal surfaces of rails 18 having the upturned edges 19 for guiding wheels 17 and restricting carriage 15 to linear movement transverse to that of carriage 13. Motor 20 is provided with a worm gear rotor shaft 21 meshing with the gear 22 rigidly coupled to gear 23, which in turn meshes with gear 24 arranged to rotate with the template follower shaft 25 journalled in the bearing 25' rigidly supported from carriage 13. The lower end 26 of the template follower shaft 25 engages in contact with the contour of the template 27 along which the follower is automatically propelled by motor 20 through speed reducing gears 21, 22, 23 and 24, thereby synchronously to move carriage 13 and torch 10 to cause the torch to cut the work material 12 along the line 28, corresponding to the contour of the template 27. It will be seen that carriage 13 together with the template follower shaft 25 and torch 10 are arraged for universal movement in a horizontal plane, By providing an extended pair of rails 18 several carriages 15 together with the apparatus supported thereby may be simultaneously employed on the same rails to expedite the work on a large piece of work material.

Fig. 2 shows in detail one arrangement of the template follower 25. The channel shaped template 27 is provided with the edge or face 30 to be traced by the tracer portion 31 of shaft 25 and is provided with the oblique edge or face 32 to be engaged by the frustro-conical driver portion 33 of shaft 25. The surface 33 of the driver is fluted or otherwise arranged to insure good frictional contact with the edge 32. The upper end of shaft 25 is arranged for free axial movement in sleeve 34 within which is threaded the screw 35 having a tip 35' loosely engaging the axial groove 36 in shaft 25, thereby to guide the axial movement of the shaft and to transmit rotational energy from sleeve 34 to shaft 25. Sleeve 34 is fast at its upper end to gear 24 and is journalled in the bearing 25'. Upward axial movement of sleeve 34 in bearing 25' is prevented by collar 37 made fast to the sleeve by set screw 38. Downward axial movement of sleeve 34 is prevented by gear 24 abutting on bearing 25'.

The cylindrical weight 39 surrounding shaft 25 and supported by the lower end 26, urges the shaft axially downward thereby bringing the driving portion 33 into close contact with the edge 32 of the template and producing a resultant force causing the tracer portion 31 of the shaft to engage closely with the template edge 30. The frictional surface of the driving portion 33 rolls along the edge 32 and propels shaft 25 along the edge of the template, the shaft being guided by the tracer portion 31 which follows the edge 30 of the template.

For the purpose of axially moving shaft 25 in sleeve 34 to change its relation with template 27, a series of alternate annular ridges 40 and recesses 41 are provided at the upper end of shaft 25, coaxial with the axis of the shaft, the spur gear 42 meshing with the rack thus formed and being provided with the hand lever 43 fast thereto, by means of which the gear is manually rotated on shaft 44 axially to displace shaft 25. Shaft 44 is journalled in bracket 44' rigidly supported from carriage 13. When handle 43 is raised gear 42 rotates in a clockwise direction thereby to lift the tracer portion 31 from the channel between the edges 30 and 32 of the template so that the follower may be moved from one part of the template to another, or lifted free of the template. Inasmuch as groove 36 is axially directed, shaft 25 is free to move axially in sleeve 34 without interfering with rotation of driving gear 24 and sleeve 34.

Rotation of shaft 25 causes the portion 33 to roll on the template while the portion 31 rotates in such a direction as to slide on the surface 30 with which it contacts, thus causing a certain amount of friction. While this form of template follower may be used satisfactorily in certain classes of work in spite of the friction, and particularly where it is desired to employ a relatively simple form of template follower mechanism, it is objectionable in certain other work and requires a somewhat complicated template. The arrangements shown in Figs. 3 and 4, which may be substituted for the lower portion of shaft 25, Fig. 2 substantially obviate the undesirable friction between elements 30 and 31, and permit of using a much simpler form of template than template 27.

In Fig. 3 the shaft 45 is provided with the frustro-conical driving portion 46 for engaging the upper left hand edge of the template strip 47. The frame or weight 48 within shaft 45 is journalled carries the upper thrust bearing plate 49 having an annular raceway 50 for ball bearings. The lower thrust bearing plate 51 having a complementary raceway for the ball bearings rests on the shoulder 52 at the lower end of shaft 45. It will thus be seen that frame 48 is supported from shoulder 52 by ball bearings in the raceway 50 between the bearing plates 49 and 51, thus providing an antifriction bearing between the frame 48 and shaft.

The gear 53 fast to shaft 45 meshes with the gear 54 fast to shaft 55 having the tracer 56 for engaging the right hand surface of template 47. Rotation of shaft 45 causes the driving portion 46 of the shaft to propel the follower along template 47, at the same time causing rotation of shaft 55 by way of gears 53 and 54 and causing the tracer portion 56 to roll along the right hand surface or edge of template 47. Roller 56 is so proportioned in diameter with respect to gear 53 and 54 and driver 46 as to have substantially the same peripheral speed at the point of contact with template 47 as the portion of the driver 46 engaging in contact with the template. Uniform and substantially frictionless movement of the follower along the template is thus provided.

In Fig. 4 gear 57 fast to shaft 45 meshes with gear 58 fast to shaft 59 having the driver portion 60, corresponding to the driver portion 46 of Fig. 3, for supporting the frame 61 by thrust bearings similar to the thrust bearings 49 and 51 of Fig. 3. The shaft 62 and tracer portion 63, corresponding to shaft 55 and tracer 56 in Fig. 3, are rotated by gear 64 fast thereto and meshing with gear 65 fast to shaft 59. It will be noted that the axis of shaft 59 is offset from the axis of shaft 45 so that the axis of shaft 45 is disposed between the axes of shafts 59 and 62 and approximately intersects the template between the edges engaged by the follower portions 60 and 63, or may intersect the edge of the template engaged by the tracer. Owing to this disposition of the axis of shaft 45 with respect to template 47, shaft 45 more accurately follows the configuration of the template, particularly at bends and at places where the direction of the template changes.

The action of the frustro-conical drivers 46 and 60 is similar to that of driver 33, Fig. 2, in that the weight of frames 48 and 61, respectively, urges the portions 46 and 60 downwardly, at the same time producing a resultant force drawing the tracers 56 and 63, respectively, closely into contact with template 47. Owing to the disposition of the driver and tracer portions of the follower on opposite sides of the template, rotation of frame 48, Fig. 3, and of frame 61, Fig. 4, with respect to the template is prevented.

Template 47 is of much simpler form than template 27 and may be constructed from a strip of any substantial solid material, for example, metal, fiber or wood, and is preferably of such soft or flexible material that it may be readily formed into any desired shape for use as a template, at the same time being capable of suitably retaining its shape under the stresses imposed by the template follower. The cleats 66, of solder or any other suitable material at the lower edge of each side of the strip, anchor the strip to a supporting base 67 to maintain the strip in its desired form when subjected to such stresses as are imposed by the template follower or by handling of the template. If desired, portions 47 and 67 of the template may be integrally formed as by welding, casting, soldering, riveting, bolting or other method. The template 27, Fig. 2, may be secured to the base in the same manner as template 47 is secured to base 67. When a template and base are cast, it is advantageous to employ relatively pliant material of low melting point such as lead, tin, solder, aluminum, or other convenient and cheap material which lends itself readily to forming to the desired shape when cold.

I claim:

1. In a machine of the character described, a carriage arranged for universal movement in a plane, a thermal instrumentality supported from said carriage, a shaft supported from said carriage on an axis normal to said plane for following the contour of a template, means for rotating said shaft, said shaft being axially movable without interfering with said rotating means, and means for axially lifting said shaft.

2. In a machine of the character described, a carriage arranged for universal movement in a plane, a thermal instrumentality supported from said carriage, a shaft supported from said carriage on an axis normal to said plane for following the contour of a template, means for rotating said shaft, said shaft being mounted for axial movement without interference with said rotating means, and a hand lever pivoted to said carriage and having a member fast thereto for engaging said shaft to cause axial movement thereof.

3. In a machine of the character described, a carriage arranged for universal movement in a plane, a thermal instrumentality supported from said carriage, a shaft supported from said carriage on an axis normal to said plane for following the contour of a template, means for rotating said shaft, said shaft being axially movable without interfering with said rotating means, said shaft having a series of alternate annular recesses and ridges coaxial with the shaft, and a spur gear for meshing therewith for axially moving said shaft.

4. In a machine of the character described, a carriage arranged for universal movement in a plane, a thermal instrumentality supported from said carriage, a shaft supported from said carriage on an axis normal to said plane for following the contour of a template, means for rotating said shaft, said shaft being axially movable without interfering with said rotating means, a rack fast to said shaft, and a gear supported from said carriage and meshing with said rack to cause axial movement of said shaft.

5. In a machine of the character described, a carriage arranged for universal movement in a horizontal plane, a thermal instrumentality supported from said carriage, a shaft supported from said carriage on a vertical axis for following the contour of a template, means for rotating said shaft, said shaft being axially movable without interfering with said rotating means, a weighted member carried by said shaft to urge the shaft axially downward, and means for axially raising said shaft.

6. In apparatus of the character described, a fixed template having an edge to be traced and a similarly directed auxiliary edge adjacent thereto, a follower for said template comprising a main shaft having a frame at one end, a tracing shaft journalled in said frame, and having a tracing portion for engaging the tracing edge of said template, a driving shaft journalled in said frame and having a portion for engaging said auxiliary edge, means for rotating said main shaft, and means coupling said shafts for causing said engaging portions automatically to roll on the edges of said template.

7. In apparatus of the character described, a fixed template having an edge to be traced and a similarly directed auxiliary edge adjacent thereto, a follower for said template comprising a main shaft having a frame at one end, a tracing shaft journalled in said frame and having a tracing portion for engaging the tracing edge of said template, a driving shaft journalled in said frame and having a portion for engaging said auxiliary edge, means for rotating said main shaft, the axis of said main shaft being disposed between the axes of said tracer and driver shafts, and means coupling said shafts for causing said engaging portions automatically to roll on the edges of said template.

8. In a machine of the character described, a carriage arranged for universal movement in a plane, a blow torch supported from said carriage, a shaft supported from said carriage on an axis normal to said plane for following the contour of a template, means for rotating said shaft, a member non-rotatable with respect to the template and carried by said shaft to urge the shaft axially toward the template, and a thrust bearing between said shaft and said member to permit of free rotation of the shaft with respect to said member.

9. In a machine of the character described, a carriage arranged for universal movement in a plane, a blow torch supported from said carriage, a shaft supported from said carriage on an axis normal to said plane for following the contour of a template, means for rotating said shaft, a member non-rotatable with respect to said template for urging said shaft axially toward the template, and an anti-friction bearing for permitting free rotation of said shaft with respect to said member.

10. In apparatus of the character described, a template follower comprising a main shaft, having a frame at one end, a tracing shaft journalled in said frame for tracing the contour of a template, and a driving shaft journalled in said frame on an axis offset from the axis of said main shaft for engaging said template and propelling said follower in accordance with the contour of the template.

Signed by me at Boston, Massachusetts, this 9th day of April, 1924.

ADOLF KREBS.